(12) United States Patent
Berg et al.

(10) Patent No.: US 9,734,004 B2
(45) Date of Patent: Aug. 15, 2017

(54) ANALYTICS OUTPUT FOR DETECTION OF CHANGE SETS SYSTEM AND METHOD

(71) Applicant: International Business Machines Corporation, Armonk, NY (US)

(72) Inventors: Daniel C. Berg, Holly Springs, NC (US); Nihilson Gnanadason, Nagar (IN); Rajan Kumar, Rajapalayam (IN); Siddalinga S. Mathad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 14/566,806

(22) Filed: Dec. 11, 2014

(65) Prior Publication Data

US 2015/0254124 A1  Sep. 10, 2015

Related U.S. Application Data

(63) Continuation of application No. 14/201,139, filed on Mar. 7, 2014, now Pat. No. 9,372,745.

(51) Int. Cl.
*G06F 11/00* (2006.01)
*G06F 11/07* (2006.01)
*G06F 11/34* (2006.01)
*H04L 29/08* (2006.01)

(52) U.S. Cl.
CPC ........ *G06F 11/079* (2013.01); *G06F 11/0709* (2013.01); *G06F 11/0778* (2013.01); *G06F 11/3495* (2013.01); *H04L 67/10* (2013.01); *H04L 67/22* (2013.01)

(58) Field of Classification Search
CPC ............... G06F 11/079; G06F 11/0778; G06F 11/3495; G06F 11/3079; G06F 11/0766
See application file for complete search history.

(56) References Cited

U.S. PATENT DOCUMENTS

| | | | |
|---|---|---|---|
| 7,475,286 B2 | 1/2009 | Altaf et al. | |
| 7,502,967 B1* | 3/2009 | Li | G06F 11/0715 714/38.14 |
| 7,788,540 B2 | 8/2010 | Merriman et al. | |
| 8,499,280 B2 | 7/2013 | Davies et al. | |
| 9,372,745 B2* | 6/2016 | Berg | G06F 11/079 |
| 2006/0190770 A1 | 8/2006 | Harding | |
| 2011/0016347 A1 | 1/2011 | Brodeur et al. | |
| 2011/0258164 A1 | 10/2011 | Mandagere et al. | |
| 2014/0201573 A1 | 7/2014 | Huang et al. | |

OTHER PUBLICATIONS

"Would be Awesome to Be Able to Link Log Statements or Stack Traces to Source Code," http://github.com/hawtio/hawtio/issues/104, downloaded Jan. 21, 2014, pp. 1-3.
Jenkins, "Smarter Broken build Email Notification," https://issues.jenkins-ci-org/browse/JENKINS-8202, downloaded Jan. 21, 2014, pp. 1-2.

\* cited by examiner

*Primary Examiner* — Philip Guyton
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving, at a computing device, logs and traces from one or more sources. The logs and traces are analyzed for problem imprints associated with an error. A set of one or more candidate lists is generated from the logs and traces. A change set from the set of one or more candidate lists that caused the error is identified.

6 Claims, 7 Drawing Sheets

US 9,734,004 B2

ANALYTICS OUTPUT FOR DETECTION OF CHANGE SETS SYSTEM AND METHOD

RELATED APPLICATIONS

The subject application is a continuation application of U.S. patent application with Ser. No. 14/201,139, filed on Mar. 7, 2014, the entire content of which is herein incorporated by reference.

BACKGROUND

As the need for computing environments (e.g., from desktop to servers to devices to smart machines, etc.) grows, the amount of data created as, e.g., logs/traces may grow exponentially. Though there may be methodologies/tools to analyze these logs/traces to detect problems, it may still be difficult to draw certain conclusions for the problem.

BRIEF SUMMARY OF DISCLOSURE

In one implementation, a method, performed by one or more computing devices, may include but is not limited to receiving, at a computing device, logs and traces from one or more sources. The logs and traces may be analyzed for problem imprints associated with an error. A set of one or more candidate lists may be generated from the logs and traces. A change set from the set of one or more candidate lists that caused the error may be identified.

One or more of the following features may be included. A super set of candidate lists may be generated from the change set retrieved using a building number, wherein the super set of candidate lists may be used to find a subset of candidate lists from the problem imprints. The set of one or more candidate lists may include at least one item, wherein the at least one item may include at least one of a source file name, a configuration file name, and an artifact name. The change set for each item in the set of one or more candidate lists may be received. The generated set of one or more candidate lists may be filtered. The filtering may be based upon, at least in part, a filter condition that may include at least one of a package name and a timestamp. The change set may be filtered. The filtering may be based upon, at least in part, a filter condition that may include at least one of a resolver name and a timestamp.

In another implementation, a computing system includes a processor and a memory configured to perform operations that may include but are not limited to receiving logs and traces from one or more sources. The logs and traces may be analyzed for problem imprints associated with an error. A set of one or more candidate lists may be generated from the logs and traces. A change set from the set of one or more candidate lists that caused the error may be identified.

One or more of the following features may be included. A super set of candidate lists may be generated from the change set retrieved using build number, wherein the super set of candidate lists may be used to find a subset of candidate lists from the problem imprints. The set of one or more candidate lists may include at least one item, wherein the at least one item may include at least one of a source file name, a configuration file name, and an artifact name. The change set for each item in the set of one or more candidate lists may be received. The generated set of one or more candidate lists may be filtered. The filtering may be based upon, at least in part, a filter condition that may include at least one of a package name and a timestamp. The change set may be filtered. The filtering may be based upon, at least in part, a filter condition that may include at least one of a resolver name and a timestamp.

In another implementation, a computer program product resides on a computer readable storage medium that has a plurality of instructions stored on it. When executed by a processor, the instructions cause the processor to perform operations that may include but are not limited to receiving logs and traces from one or more sources. The logs and traces may be analyzed for problem imprints associated with an error. A set of one or more candidate lists may be generated from the logs and traces. A change set from the set of one or more candidate lists that caused the error may be identified.

One or more of the following features may be included. A super set of candidate lists may be generated from the change set retrieved using build number, wherein the super set of candidate lists may be used to find a subset of candidate lists from the problem imprints. The set of one or more candidate lists may include at least one item, wherein the at least one item may include at least one of a source file name, a configuration file name, and an artifact name. The change set for each item in the set of one or more candidate lists may be received. The generated set of one or more candidate lists may be filtered. The filtering may be based upon, at least in part, a filter condition that may include at least one of a package name and a timestamp. The change set may be filtered. The filtering may be based upon, at least in part, a filter condition that may include at least one of a resolver name and a timestamp.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
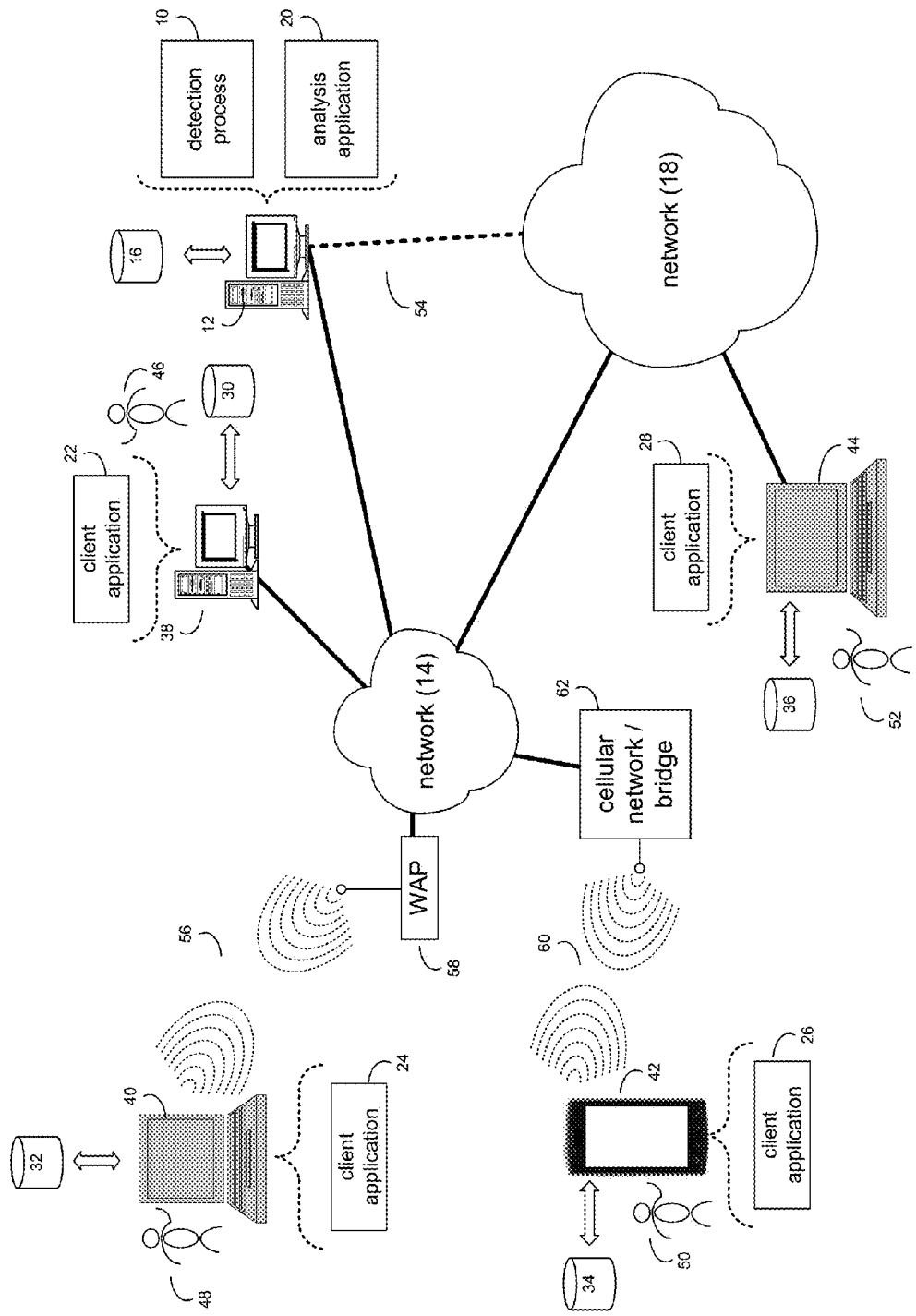
FIG. 1 is an illustrative diagrammatic view of a detection process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown detection process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, detection process 10 may receive logs and traces from one or more sources. The logs and traces may be analyzed for problem imprints associated with an error. A set of one or more candidate lists may be generated from the logs and traces. A change set from the set of one or more candidate lists that caused the error may be identified.

The instruction sets and subroutines of detection process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Detection process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a analysis application (e.g., analysis application 20), examples of which may include, but are not limited to, e.g., a data capture application, a data curation application, a data storage application, a data search application, a data sharing application, a data transfer application, a data analysis application, a data visualization application, or other application that allows for database management and/or data (e.g., "big data") processing/analysis. "Big data" may be generally described as a collection of data sets so large and complex that it may become difficult to process using standard database management tools or traditional data processing applications. Detection process 10 and/or analysis application 20 may be accessed via client applications 22, 24, 26, 28. Detection process 10 may be a stand alone application, or may be an applet/application/script/extension that may interact with and/or be executed within analysis application 20, a component of analysis application 20, and/or one or more of client applications 22, 24, 26, 28. Analysis application 20 may be a stand alone application, or may be an applet/application/script/extension that may interact with and/or be executed within detection process 10, a component of detection process 10, and/or one or more of client applications 22, 24, 26, 28. One or more of client applications 22, 24, 26, 28 may be a stand alone application, or may be an applet/application/script/extension that may interact with and/or be executed within and/or be a component of detection process 10 and/or analysis application 20. Examples of client applications 22, 24, 26, 28 may include, but are not limited to, e.g., a data capture application, a data curation application, a data storage application, a data search application, a data sharing application, a data transfer application, a data analysis application, a data visualization application, or other application that allows for database management and/or data processing/analysis, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of detection process 10 (and vice versa). Accordingly, detection process 10 may be a purely server-side application, a purely client-side application, or a hybrid server-side/client-side application that is cooperatively executed by one or more of client applications 22, 24, 26, 28 and/or detection process 10.

One or more of client applications 22, 24, 26, 28 may be configured to effectuate some or all of the functionality of analysis application 20 (and vice versa). Accordingly, analysis application 20 may be a purely server-side application, a purely client-side application, or a hybrid server-side/client-side application that is cooperatively executed by one or more of client applications 22, 24, 26, 28 and/or analysis application 20. As one or more of client applications 22, 24, 26, 28, detection process 10, and analysis application 20, taken singly or in any combination, may effectuate some or all of the same functionality, any description of effectuating such functionality via one or more of client applications 22, 24, 26, 28, detection process 10, analysis application 20, or combination thereof, and any described interaction(s) between one or more of client applications 22, 24, 26, 28, detection process 10, analysis application 20, or combination thereof to effectuate such functionality, should be taken as an example only and not to limit the scope of the disclosure.

Users 46, 48, 50, 52 may access computer 12 and detection process 10 (e.g., using one or more of client electronic devices 38, 40, 42, 44) directly through network 14 or through secondary network 18. Further, computer 12 may be connected to network 14 through secondary network 18, as illustrated with phantom link line 54. Detection process 10 may include one or more user interfaces, such as browsers and textual or graphical user interfaces, through which users 46, 48, 50, 52 may access detection process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices (e.g., DEVICES 64, 66, 68, 70) to be interconnected using a short-range wireless connection. Other forms of interconnection (e.g., Near Field Communication (NFC)) may also be used.

Figure 2:
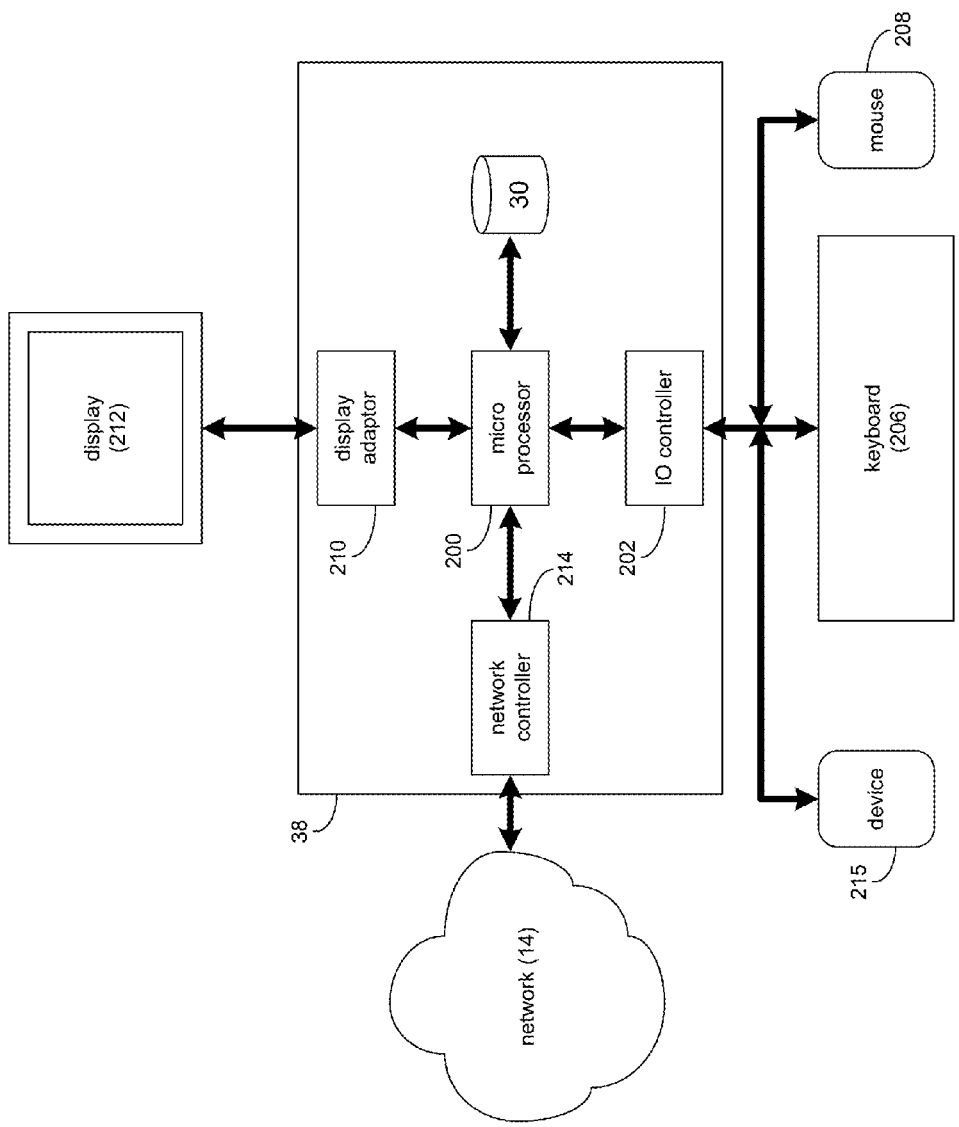
FIG. 2 is a diagrammatic view of a client electronic device of FIG. 1 according to one or more implementations of the present disclosure.
Figure 3:
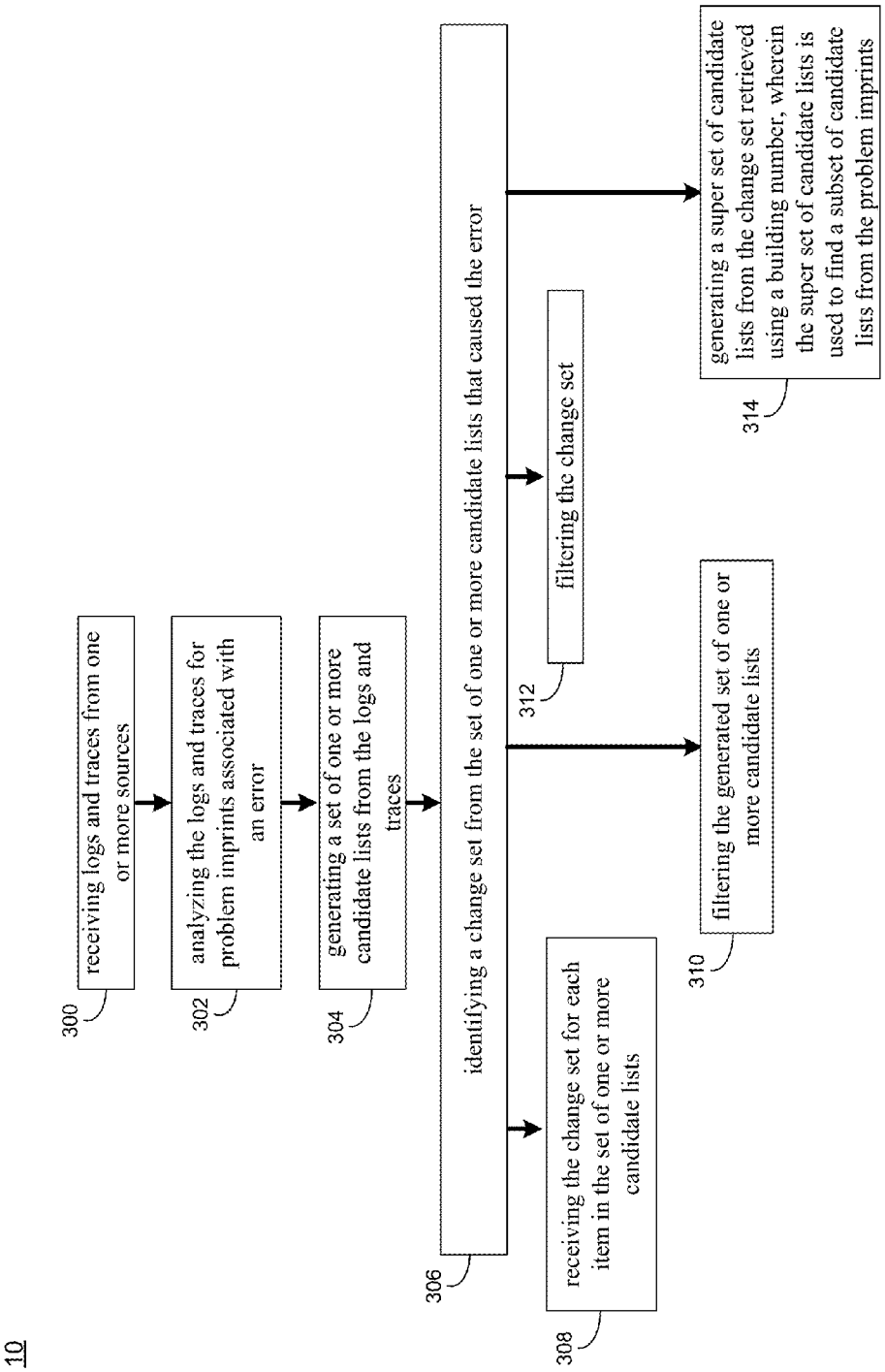
FIG. 3 is an illustrative flowchart of the detection process of FIG. 1 according to one or more implementations of the present disclosure.
Figure 4:
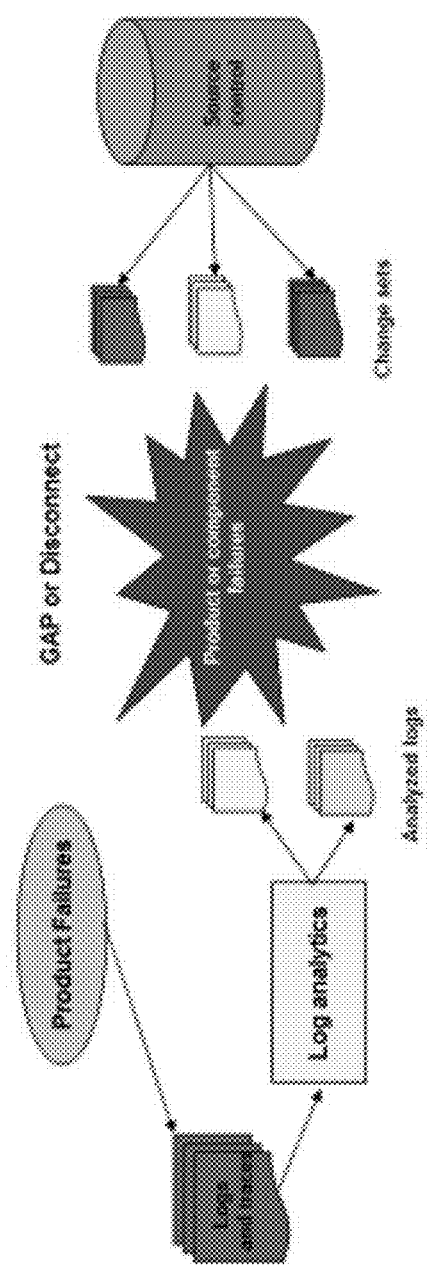
FIG. 4 is an illustrative diagrammatic view of a computer environment according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, detection process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Detection Process:

As discussed above and referring also to FIGS. 3-7, detection process 10 may receive 300, at a computing device, logs and traces from one or more sources. Detection process 10 may analyze 302 the logs and traces for problem imprints associated with an error. Detection process 10 may generate 304 a set of one or more candidate lists from the logs and traces. Detection process 10 may identify 306 a change set from the set of one or more candidate lists that caused the error.

In some implementations, detection process 10 may address the gap that may exist between the logs/tracing information and the actual source code that "dumped" the logs/tracing information. For instance, there may be disconnects (e.g., gaps) between the development and operational environments in terms of, e.g., processes, information sharing, etc. that may result in little to no correlation between the information generated in the logs and/or trace files, and the actual problem occurred due to the changes in the software environment holding the source code, change sets, etc. An example illustrating such a gap may be shown at FIG. 4 in computer environment 400.

For instance, even with detection process 10 being configured with various log/trace file analytics tools to determine if errors exist, it may still be beneficial to directly correlate the root cause of the error to the segment of a source file giving rise to the error. As will be discussed in greater detail below, detection process 10 may extend the analytics tools to "smartly" detect and identify change sets, files, or segments that potentially caused the error. For instance, detection process 10 may leverage existing analysis (e.g., problem detection) tools that help to load these huge sets of logs and give different views and perspectives of errors and exception conditions captured, but may add the capability to work in tandem with the source code of the application and/or the source control (e.g., a repository of such things as source files, configuration files, artifacts, product changes, etc.) of the product that caused the exception condition. As such, as will be discussed in greater detail below, detection process 10 may "smartly" fetch the information from logs and trace and use that information to intelligently match information from the source control.

In some implementations, detection process 10 may identify for each error in an error log/stack/trace, etc. a candidate list of files that may have led to the error, and further, for each file in the candidate list, may identify a change set that may have caused the error. In some implementations, a change set may include the set of changes that went into a (set of) source/configuration file(s) to alter the behavior of the associated software. The change sets that are incomplete or incorrectly delivered to the software solution may cause abnormal behavior in the software, and may lead to error. For example, in some implementations, detection process 10 may receive 300, at a computing device, logs and traces from one or more sources. For instance, assume for example purposes only that a program is being executed, e.g., at client electronic device 38. Further assume that the program does not execute properly. In the example, information about the program's execution may be recorded at various locations such as storage device 30 by, e.g., analysis application 20, detection process 10, client application 22 or combination thereof, and may be received 300 by detection process 10. Such information about the program's execution may include, e.g., "high level" information (e.g., a failed installation of a program) and "low level" information (e.g., a thrown exception).

Figure 5:
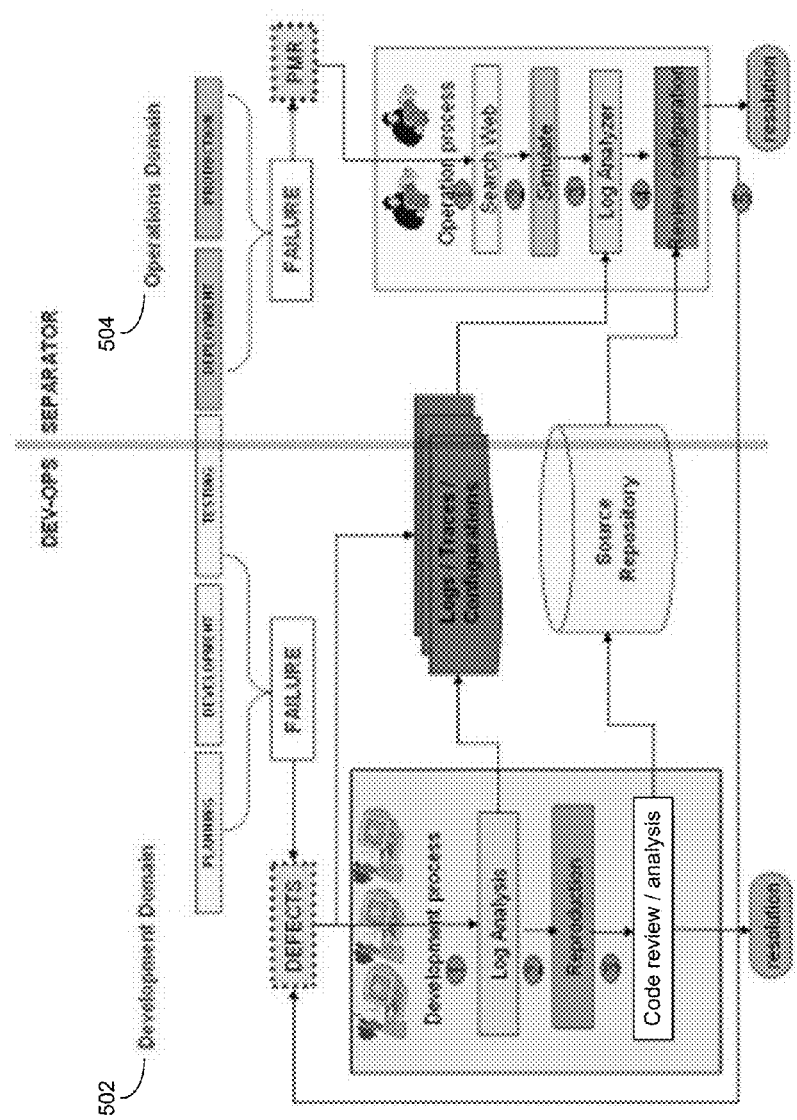
FIG. 5 is an illustrative diagrammatic view of an application infrastructure environment according to one or more implementations of the present disclosure.

Referring at least to FIG. 5, an example application infrastructure environment 500 is shown describing the different example components of a development domain 502 and an operations domain 504 during a failure/error/exception. For example, the left side of FIG. 5 (development domain 502) may correspond to the development and support teams who may review the logs and/or traces in order to resolve problems. The right side of FIG. 5 (operations domain 504) may correspond to the operations/admin teams who may primarily take care of the installation, deployment and maintenance of the production environments. As can be seen, FIG. 5 may demonstrate, e.g., 1) the above-noted disconnect (e.g., gap) between the development and the operations team, and 2) the disconnect between the logs/traces and the source code. Development teams (e.g., via detection process 10) may be involved with planning, designing, code development, testing, etc., and there may be failures/errors during any of these activities and a defect may be raised to address. To resolve the defects, the developers may (e.g., via detection process 10) review several artifacts including, e.g., the logs/traces/configuration files gathered from the environment where the failure happened. It's possible that the developer may manually review the source code. Likewise, the operation teams may address the application/software deployment and/or monitoring, and when the operation teams notice any issues/failure, the operation teams try to address them by, e.g., referring to known solutions discussed on the web, seeking out help from known experts, etc. It's possible that if the operation teams are unable to resolve the issues, the operation teams may reach out to the appropriate software/application teams through an agreed process, such as defects/bugs, etc.

In some implementations, detection process 10 may analyze 302 the logs and traces for problem imprints associated with an error. For example, after receiving 300 the above-noted logs and traces from storage device 30 (and/or other various sources) that detail the execution of the program, detection process 10 may analyze 302 the logs and traces to identify various problem imprints (e.g., useful information associated with the failed execution of the program) from the logs and traces. For instance, analysis application 20 may be extended (e.g., via detection process 10) to indentify various problem imprints in the above-noted logs and trace files. For instance, the stack traces, info messages, some of deployment messages from logs, etc. may become problem imprints (e.g., as explained in FIG. 6 for some problem imprints), which may be used for finding the above-noted change sets.

Figure 6:
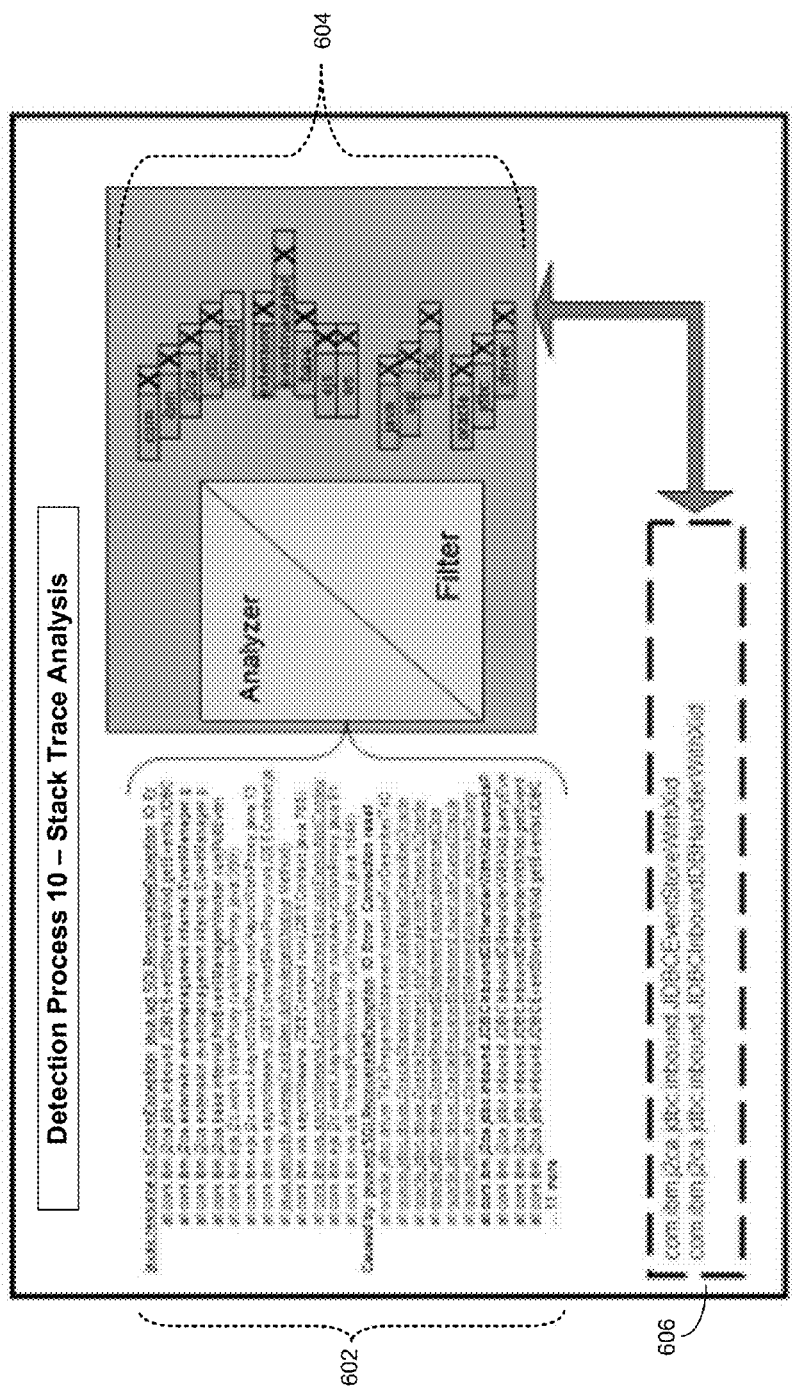
FIG. 6 is a diagrammatic view of an illustrative stack trace analysis environment according to one or more implementations of the present disclosure.
Figure 7:
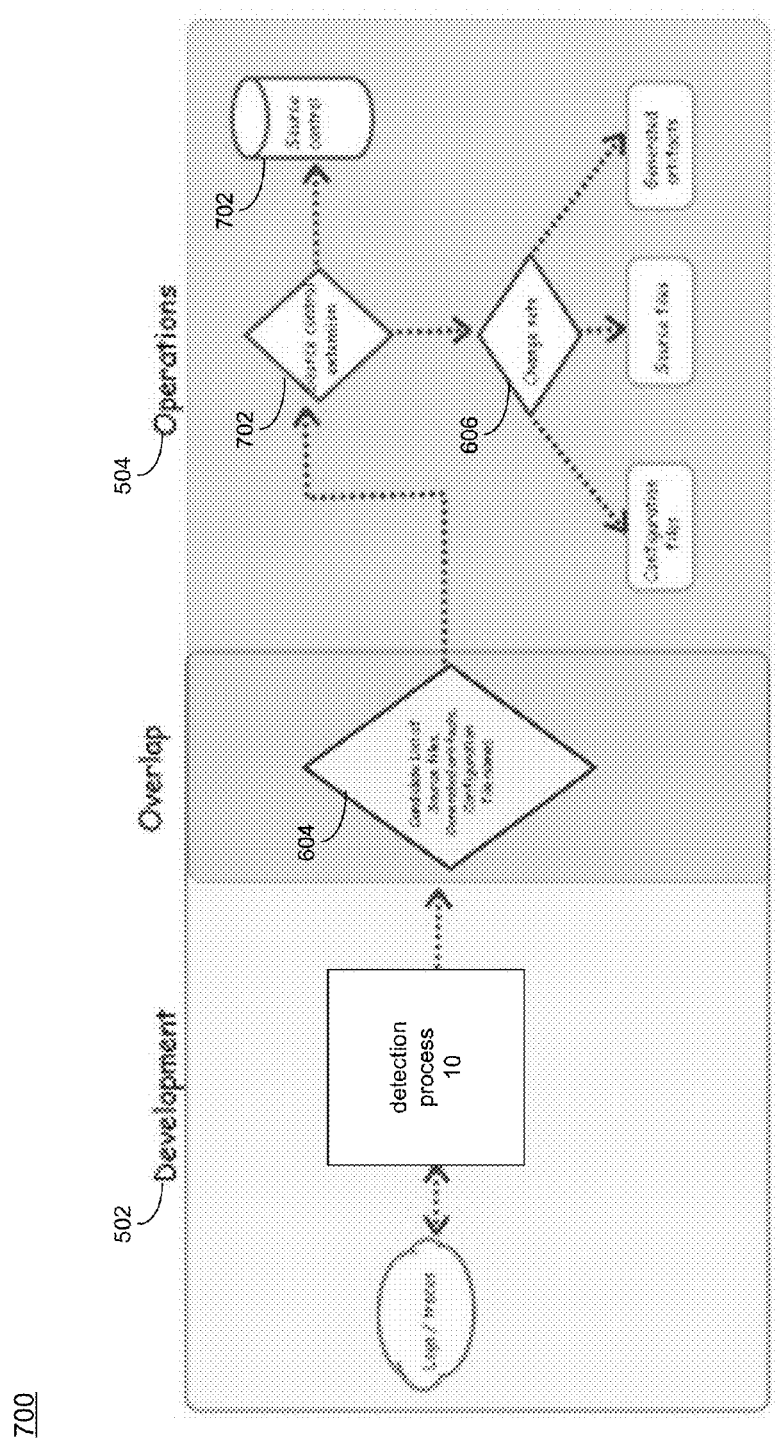
FIG. 7 is a diagrammatic view of an illustrative computer environment according to one or more implementations of the present disclosure.

In some implementations, and referring at least to the stack trace analysis environment 600 of FIG. 6, detection process 10 may generate 304 a set of one or more candidate lists from the logs and traces. For example, after analyzing 302 the above-noted logs and traces (e.g., log/trace files 602), detection process 10 may generate 304 a set candidate lists and/or subset of candidate lists (e.g., candidate list 604). For instance, detection process 10 may identify the above-noted log message to generate the candidate list of source file names and/or artifact names by going through the above-noted repository, which may include a version repository identifying different versions of the program at different times. Detection process 10 may identify deployment configuration changes to generate the candidate list for configuration files. In some implementations, detection process 10 may generate 314 a super set of candidate lists from the change set retrieved using a building number, wherein the super set of candidate lists may be used to find a subset of candidate lists from the problem imprints. For example, a super set of candidate list(s) may be generated by detection process 10 using the above-noted change sets, which went in the particular build of the solution/product. In some implementations, the build number may be fetched by detection process 10 from the product/solution deployment information. Detection process 10 may fetch the change sets that went into the build from the above-noted repository. From these change set, detection process 10 may generate 314 the super set of candidate list. Detection process 10 may then identify the various problem imprints from logs and traces as explained above. In some implementations, detection process 10 may use super set of candidate list(s) to find a subset of candidate list(s) from the problem imprints as explained in FIG. 6. In some implementations, detection process 10 may be only interested in the source files fetched from log analysis problem imprints, which may be also mentioned in the super set to generate a final list of candidate list. As can be seen at least from FIG. 6, detection process 10 may fetch candidate list of source files from a stack trace, and then may be filtered (as described above) based on, e.g., package, and further filtered (as described above), e.g., by comparing with the above-noted super set. In some implementations, the set of one or more candidate lists may include at least one item, wherein the at least one item may include at least one of a source file name, a configuration file name, and an artifact name. The item may also include, e.g., any repository files associated with the above-noted logs and traces.

In some implementations, detection process 10 may identify 306 a change set from the set of one or more candidate lists that caused the error. For instance, and still referring to FIG. 6, detection process 10 may identify 306 a change set (e.g., change set 606), which may include a list of candidates (e.g., source file names, a configuration file names, artifact names, etc.) from the generated 304 candidate list 604.

As noted above, a change set may include the set of changes that went into a set of source/configuration file(s) to alter the behavior of associated software. Change sets may be 306 identified from, e.g., a build number of the product or application. In some implementations, source repositories may maintain change sets delivered to each build. Detection process 10 may fetch change sets from the repository to generate, e.g., the above-noted set of candidate lists and/or the above-noted super set of candidates and may use analysis output to filter further and generate the above-noted final list of candidates, which may have caused the wrong behavior of the product.

In some implementations, detection process 10 may receive 308 the change set for each item in the set of one or more candidate lists. For example, as noted above, detection process 10 may identify the above-noted log message and/or deployment configuration changes to generate 304 the candidate list of source file names and/or artifact names and/or configuration files by going through the above-noted repository, which may include a version repository identifying different versions of the program at different times.

In some implementations, detection process 10 may filter 310 the generated set of one or more candidate lists. In some implementations, detection process 10 may enable a user (e.g., user 48) to filter 310 the generated set of one or more candidate lists via a user interface (not shown). For example, the filtering 310 may be based upon, at least in part, a filter condition that may include at least one of a package name and a timestamp. In the example, the package name and/or timestamp may be objects in the user interface that may be selected by user 48 to denote the filter conditions of the candidate lists. It will be appreciated that filtering 310 by package name and/or timestamps is an example only, as filtering 310 may be implemented using different conditions. Filtering 310 may be used to display a reduced set amongst candidate lists for quicker review and may be based on, e.g., the above-noted custom filter criteria condition.

Similarly, detection process 10 may filter 312 the change set. In some implementations, detection process 10 may enable a user (e.g., user 48) to filter 312 the identified 306 change set via a user interface (not shown). For example, the filtering 312 may be based upon, at least in part, a filter condition that may include at least one of a resolver name and a timestamp. In the example, the resolver name and/or timestamp may be objects in the user interface that may be selected by user 48 to denote the filter conditions of the change set. It will be appreciated that filtering 312 by resolver name and/or timestamps is an example only, as filtering 312 may be implemented using different conditions (e.g., resolution time, associated defect, developer name who delivered the change set, etc.). Filtering 312 may be used to display a reduced set amongst change sets for quicker review and may be based on, e.g., the above-noted custom filter criteria condition.

In some implementations, the output from detection process 10 (e.g., the above-noted set of candidate lists) may be picked by another component (e.g., a source control extension). For example, and referring at least to the example computing environment 700 of FIG. 7, analysis application 20 may include, e.g., a source control extension component 702 to interact with source controller 704. For instance, source controller extension 702 may use one or more Application Programming Interfaces (APIs) provided by individual source controllers (e.g., source controller 704) to extract the above-noted change set information. In the example, source controller 704 may receive the candidate list information from detection process 10. In some implementations, source controller 704 may fetch from the source control the change-set history for each candidate in the candidate list. In some implementations, detection process 10 may interact with source control extension 702 to fetch and receive the above noted candidate list and/or change sets.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   receiving, at a computing device, logs and traces from one or more sources;
   analyzing the logs and traces for problem imprints associated with an error;
   generating a set of one or more candidate lists from the logs and traces;
   identifying a change set from the set of one or more candidate lists that caused the error;
   providing a user interface including a plurality of objects, the objects including one or more of a resolver name and a timestamp;
   receiving a user selection of one or more objects in the user interface; and
   filtering the change set, wherein filtering is based upon, at least in part, a user selection of a filter condition that includes at least one of the resolver name and the timestamp.

2. The computer-implemented method of claim 1 wherein the set of one or more candidate lists includes at least one item, wherein the at least one item includes at least one of a source file name, a configuration file name, and an artifact name.

3. The computer-implemented method of claim 2 further comprising receiving the change set for each item in the set of one or more candidate lists.

4. The computer-implemented method of claim 1 further comprising filtering the generated set of one or more candidate lists.

5. The computer-implemented method of claim 4 wherein the filtering is based upon, at least in part, a filter condition that includes at least one of a package name and a timestamp.

6. The computer-implemented method of claim 1 further comprising generating a super set of candidate lists from the change set retrieved using a building number, wherein the super set of candidate lists is used to find a subset of candidate lists from the problem imprints.

* * * * *